United States Patent

Blumenberg

[11] 4,227,639
[45] Oct. 14, 1980

[54] METHOD OF MAKING A GAS-TIGHT JOINT BETWEEN A CORRUGATED HIGH QUALITY STEEL TUBE AND A HIGH QUALITY STEEL SLEEVE

[75] Inventor: Günther Blumenberg, Hanover, Fed. Rep. of Germany

[73] Assignee: Kabel- und Metallwerke Gutehoffnungshütte AG, Hanover, Fed. Rep. of Germany

[21] Appl. No.: 909,369

[22] Filed: May 25, 1978

[30] Foreign Application Priority Data

May 28, 1977 [DE] Fed. Rep. of Germany ....... 2724311

[51] Int. Cl.$^2$ .......................... B23K 9/02; B23K 5/02
[52] U.S. Cl. ................................ 228/173 F; 285/382; 285/286; 219/59.1; 219/137 R
[58] Field of Search .................... 219/137 R, 158, 159, 219/60 R, 60 A, 59.1, 61; 285/286, DIG. 4, 382; 228/173 F, 196

[56] References Cited

U.S. PATENT DOCUMENTS

| 1,933,749 | 11/1933 | Murray | 285/286 |
| 2,073,093 | 3/1937 | Brantly | 285/286 X |
| 2,232,656 | 2/1941 | Davis | 219/137 R |
| 2,291,706 | 8/1942 | Frease | 285/286 X |
| 3,453,716 | 7/1969 | Cook | 285/286 |
| 3,894,676 | 7/1975 | Oppenheim et al. | 219/137 R |

FOREIGN PATENT DOCUMENTS

2241741 3/1975 France ................. 285/DIG. 4

Primary Examiner—Bruce A. Reynolds
Assistant Examiner—M. H. Paschall
Attorney, Agent, or Firm—Smyth, Pavitt, Siegemund, Jones & Martella

[57] ABSTRACT

The corrugation is removed from an end portion of a helically corrugated tube, and an internally threaded sleeve is threaded onto the tube. The sleeve has an unthreaded extension which is being drawn by a suitable tool to engage the smooth wall portion of the tube and is subsequently welded thereto.

4 Claims, 2 Drawing Figures

METHOD OF MAKING A GAS-TIGHT JOINT BETWEEN A CORRUGATED HIGH QUALITY STEEL TUBE AND A HIGH QUALITY STEEL SLEEVE

BACKGROUND OF THE INVENTION

The present invention relates to a method of making a gas-tight connection or joint between a helically corrugated tube and a sleeve, wherein both parts are made of a high quality steel.

High quality steel pipes or tubes are used for the transport of cold or even very cold fluids. Such tubes are, for example, used in cryogenic cables. Generally speaking, tubes are made, for example, in a continuous manufacturing process in that a flexible strip or skelp is formed into a cylindrical configuration by bending it longitudinally into a split tube. The longitudinal joint along the strip edges is welded and the resulting tube is subsequently corrugated. This tube making technique is well known and has been practiced under utilization of a variety of materials including also high quality steel. The strip used for that purpose may well be of the thin gage variety having a thickness of less than a millimeter such as 0.3 to 0.8 mm.

Tubing of the type referred to above can be made in that manner basically in any length, depending only on the length of the strip or skelp being processed. On the other hand, tubing thus produced is, of course, used in finite, well defined lengths. Moreover, transporting the tubing to the installation site is possible only up to certain lengths depending on the transport facilities and other factors. Consequently, the need arises to provide for connection between ends of such tube lengths or between the end of a tube and other equipment. Generally speaking, one usually requires that a sleeve be connected to such an end to be connected further as required.

Attempts have been made to weld one front end of such a sleeve to the front end of a corrugated tube under utilization of a welding wire or filler rod. The welding area included a crest as well as a valley of the corrugation. However, it was found that in the case of high quality steel a flawless welding joint could not always be produced. The quality of welding was generally rather difficult to control. Moreover, it was frequently observed that the welding torch burnt a hole into the rather thin tube, and the welding joint became quite useless.

DESCRIPTION OF THE INVENTION

It is an object of the present invention to weld a corrugated tube of high quality steel to a sleeve of similar type material which does not require very great skill on the part of the welder, even though the tube may be rather thin.

In accordance with the preferred embodiment of the invention, it is suggested to provide the sleeve with an internally threaded portion as well as with a relatively thin welding extension. An end portion of the helically corrugated tube is de-corrugated, i.e. a portion of the tube is reconverted into a smooth wall tube. The axial length of that smoothed out wall should be about equal to the axial length of the welding extension of the sleeve. Next, the sleeve is threaded onto the corrugated pipe, and the welding extension is aligned with the smooth wall tube end. These parts are placed into intimate contact with each other, and the welding extension is fusion-welded onto the tube and in a manner avoiding direct contact of the tube with the arc or flame.

Placing the welding extension into intimate contact with a smooth wall portion of the tube is to mean that either the tube is radially expanded or the welding extension is formed down onto the tube, preferably by means of a special drawing tool. In either case, the area of contact between welding extension and tube should extend over the entire periphery of the tube and for an axial length of at least 5 mm from the tube's end.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIGS. 1 and 2 show one end of a tube 1. This tube has been made from a high quality steel strip being about half a millimeter thick. The strip was formed about a longitudinal axis into a cylindrical, tubular configuration so that the longitudinal edges of the strip abut. The joint was welded and the tube was helically corrugated. As stated, the Figures illustrate the end portion of such a tube which may have resulted from cutting a section from tubing which was made basically by an endless manufacturing process as described.

Figure 1:
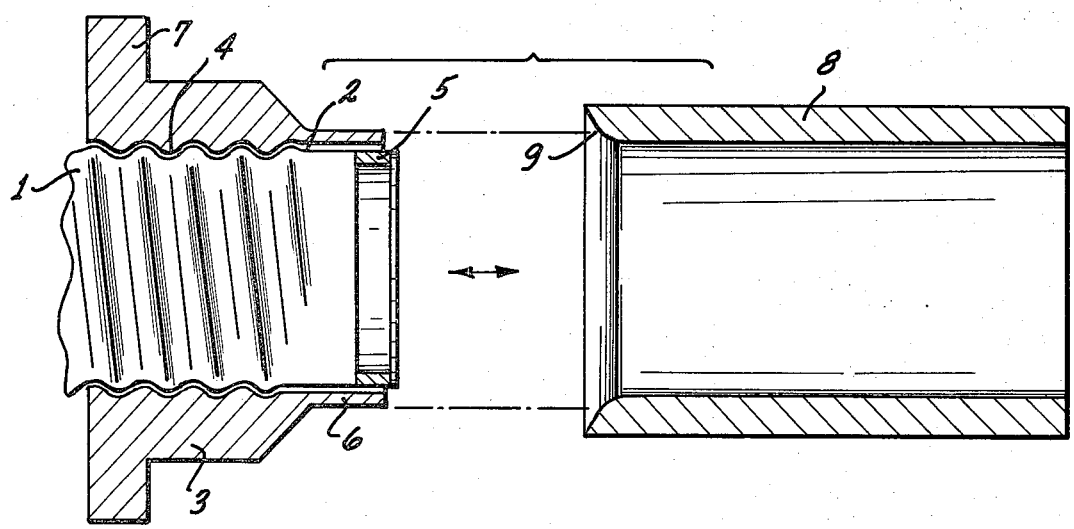
FIG. 1 is a section view through one end portion of a corrugated tube, and of a sleeve already in place for being welded to the tube, but prior to welding, the figure shows also a tool for working the end of the sleeve.

As a first, preparatory step an end portion 2 of the tube is de-corrugated, i.e. worked or re-converted into a smooth wall tube. Next, the sleeve to be welded to the tube 1 is threaded onto the tube. For this, a sleeve 3 has been provided with an internal threading 4 which corresponds to the threading-like, helical corrugation of tube 1. The sleeve 3 has an end flange 7 for purposes of further connection of that tube end once the sleeve has been welded thereto. Moreover, flange 7 will serve as support during a working process to be described and preceeding the welding. Sleeve 3 includes additionally a tubular welding extension 6 which is a thin wall portion extending axially from the threaded portion of the sleeve but having no threads. The tubular welding extension extends from the sleeve axially and opposite the end of the sleeve being provided with the flange 7.

Sleeve 3 is at first threaded onto tube 1 so that a few millimeter of the smoothed tube portion 2 projects beyond the trailing end of the sleeve. The de-corrugated end portion 2 of tube 1 has essentially an axial length equal to the axial length of the welding extension 6. FIG. 1 illustrates that these parts are, in fact, radially aligned.

In a next step, a short support bushing or ring 5 is partially inserted into tube portion 2, and projects only a little from that portion. The bushing 5 is, of course, also radially aligned with the end portion of extension 6. The ring 5 has two functions. Once, it supports the sleeve 2, and, additionally, it is used as heat sink during welding.

The support function of ring 5 is used and needed for placing portions of parts 2 and 6 into intimate contact and engagement. As can be seen from FIG. 1, the inner diameter of tubular welding extension 6 is larger than the outer diameter of smooth wall tube portion 2 to facilitate placement of sleeve 3 on tube 1. It is, however, necessary to place parts 2 and 6 in greater proximity to each other for purposes of welding. For this, one will preferably cold work the tubular or annular welding extension 6 to reduce its diameter. Bushing or ring 5 supports the tube portion 2 during this working process.

FIG. 1 illustrates also a tool 8 by means of which extension 6 is worked to reduce its diameter. The tool 8 is basically of tubular configuration, and has a conical front end 9. The tool is placed adjacent to the end of extension 6, and sleeve 3 is held from the other side at the flange 7. Next, the sleeve 8 is forced towards tubular extension 6, e.g. hydraulically or by means of several strong strokes of a hammer or otherwise, thereby forcing the conical portion 9 of the tool over and onto the end of extension 6 to reduce its diameter. The sleeve 6, in effect, is radially compressed and drawn down onto tube end 2. The process amounts to drawing the axial end portion of extension 6, forcing the material to flow axially under reduction of the diameter. The tube 2 bears against support bushing 5 during the drawing process. The extension 6 is, therefore, forced into intimate engagement with the tube end. The area of contact should extend for at least about 5 mm, measured axially from the end proper of the drawn extension.

Figure 2:
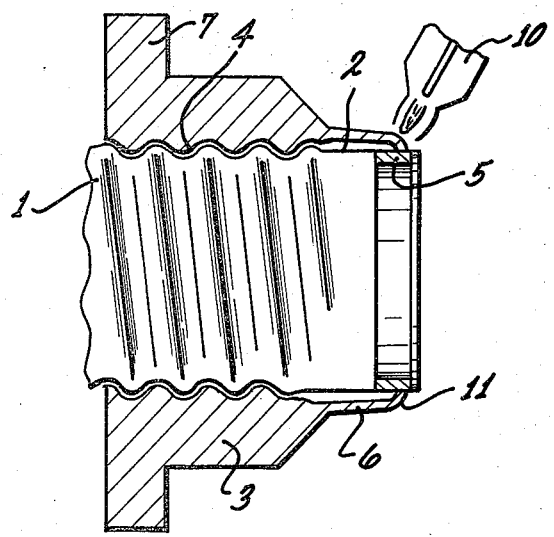
FIG. 2 is a similar section view showing the welding of the sleeve to the tube.

FIG. 2 depicts the configuration of the parts following the working by means of tool 8 and after its retraction. The ring 5 may remain inserted. Next, fusion welding is applied and an end portion of sleeve 6 is melted down to the outer diameter of tube 2, whereby these parts fuse metallurgically. The ring 5 serves as heat sink, through which heat is dissipated from the welding zone. The welding tool is of the shielded arc type or protective gas arc welding with a non consumable electrode.

During welding, the arc or flame of the welding tool 10 is not directed towards the tube portion 2, but towards the welding extension 6, melting it for a particular axial length near its end, and particularly the portion engaging the end of smooth tube 2, to thereby fuse extension 6 with the tube 2. There is no danger that the welding tool burns a hole into tubes 1 or 2.

After the annular welding seam has been completed, one may remove ring 5, but that is not essential; furthermore, the tube 2 may well have been squeezed tightly onto bushing 5. The portion of tube 2, projecting axially beyond the welding seam 11, may be sawn off.

It is important that the parts 2 and 6 are in intimate contact during welding. This engagement can be obtained also by radially expanding the tube 2, leaving the extension 6 undeformed.

The invention is not limited to the embodiments described above but all changes and modifications thereof not constituting departures from the spirit and scope of the invention are intended to be included.

I claim:

1. Method of making a gas-tight joint between a helically, internally, and externally corrugated, relatively thin-walled tube and a sleeve having a thicker wall; the tube and the sleeve being made of a high-quality steel, comprising the steps of:

providing a sleeve having internal threading, corresponding to a helical corrugation of the tube, the sleeve further having an unthreaded, tubular welding extension;

de-corrugating a portion of the tube adjacent to one end to obtain a smooth wall tube portion, the corrugation continues beyond the smooth wall portion;

causing the welding extension to be in intimate contact with the smooth wall tube portion and for an axial length, being displaced from the axial end of the smooth wall tube portion; and fusion welding the welding sleeve to the smooth wall tube portion by melting a portion of the welding sleeve for fusing with the tube.

2. Method as in claim 1, said causing step providing for such contact for an axial length of at least about 5 mm.

3. Method as in claim 1, the causing step including working the tubular welding extension to reduce its diameter.

4. Method as in claim 3, the causing step being preceeded by inserting a support bushing into the smooth wall tube, supporting the tube during the working step.

* * * * *